United States Patent
Spickard et al.

(10) Patent No.: US 11,543,044 B2
(45) Date of Patent: *Jan. 3, 2023

(54) STEPPER MOTOR DRIVEN PROPORTIONAL ROTARY ACTUATOR

(71) Applicant: Woodward, Inc., Fort Collins, CO (US)

(72) Inventors: Mark A. Spickard, Carr, CO (US); Brian K. Lawver, Rockford, IL (US)

(73) Assignee: Woodward, Inc., Fort Collins, CO (US)

( * ) Notice: Subject to any disclaimer, the term of this patent is extended or adjusted under 35 U.S.C. 154(b) by 48 days.

This patent is subject to a terminal disclaimer.

(21) Appl. No.: 17/227,033

(22) Filed: Apr. 9, 2021

(65) Prior Publication Data
US 2021/0222789 A1 Jul. 22, 2021

Related U.S. Application Data

(63) Continuation of application No. 15/228,097, filed on Aug. 4, 2016, now Pat. No. 11,015,728.

(51) Int. Cl.
*F16K 31/04* (2006.01)
*F16K 31/524* (2006.01)
(Continued)

(52) U.S. Cl.
CPC ........ *F16K 31/042* (2013.01); *F15B 13/0444* (2013.01); *F16K 31/04* (2013.01);
(Continued)

(58) Field of Classification Search
CPC ..... Y10T 137/86614; Y10T 137/86622; Y10T 137/86582; Y10T 137/86638;
(Continued)

(56) References Cited

U.S. PATENT DOCUMENTS 1,197,238 A ‡ 9/1916 Shue .................. F15B 9/14
137/625.22
2,398,229 A 4/1946 Kassouf
(Continued)

FOREIGN PATENT DOCUMENTS

CN 2847226 Y 12/2006
CN 103629389 A 3/2014
(Continued)

OTHER PUBLICATIONS

U.S. Appl. No. 15/228,097, dated Aug. 4, 2016.

*Primary Examiner* — Matthew W Jellett
(74) *Attorney, Agent, or Firm* — Reinhart Boerner Van Deuren P.C.

(57) ABSTRACT

A stepper motor driven actuator system is provided. The system includes a stepper motor, a cam, and a gearbox system. The gearbox system operatively connects the stepper motor to the cam. The cam rotates in response to stepping of the stepper motor. The system also includes a valve having a control piston located therein. The control piston is configured to translate in response to rotation of the cam. The system further includes a rotary actuator. The rotary actuator is fluidly connected to the valve, and the rotary actuator is configured to rotate the cam in response to translation of the control piston.

24 Claims, 6 Drawing Sheets

(51) Int. Cl.
  *F15B 13/044* (2006.01)
  *H02K 7/10* (2006.01)
  *F15B 15/12* (2006.01)
  *F15B 15/06* (2006.01)
  *H02K 7/06* (2006.01)
  *H02K 37/14* (2006.01)

(52) U.S. Cl.
  CPC ...... *F16K 31/043* (2013.01); *F16K 31/52483* (2013.01); *F15B 15/065* (2013.01); *F15B 15/066* (2013.01); *F15B 15/068* (2013.01); *F15B 15/12* (2013.01); *H02K 7/06* (2013.01); *H02K 7/10* (2013.01); *H02K 37/14* (2013.01); *Y10T 137/8671* (2015.04); *Y10T 137/86614* (2015.04); *Y10T 137/86622* (2015.04)

(58) Field of Classification Search
  CPC ......... Y10T 137/8663; Y10T 137/8659; Y10T 137/866; Y10T 137/87209; Y10T 137/87193; Y10T 137/87225; F16K 31/042; F16K 31/043; F16K 31/52483; F16K 31/04; F15B 9/14; F15B 13/044; F15B 15/066; F15B 15/065; F15B 15/12; F15B 15/068; H02K 37/14; H02K 7/06; H02K 7/10
  See application file for complete search history.

(56) References Cited

U.S. PATENT DOCUMENTS

| | | | | |
|---|---|---|---|---|
| 2,511,882 A ‡ | 6/1950 | Stockard | ................... | F15B 9/14 60/391 |
| 2,844,127 A ‡ | 7/1958 | Steiner | ................. | F15B 15/065 92/68 |
| 2,844,128 A | 7/1958 | Steiner | | |
| 2,884,128 A ‡ | 7/1958 | Steiner | ................. | F15B 15/065 92/136 |
| 3,273,860 A ‡ | 9/1966 | Weisenbach | ............. | B66D 1/08 254/267 |
| 3,405,727 A ‡ | 10/1968 | Hill | ..................... | F15B 13/0436 137/625.63 |
| 3,406,701 A | 10/1968 | Meulendyk | | |
| 3,435,614 A ‡ | 4/1969 | Childress | ................... | F15B 9/14 60/394 |
| 3,457,836 A ‡ | 7/1969 | Henderson | ................ | F15B 9/12 91/368 |
| 3,690,345 A | 9/1972 | Ericson | | |
| 3,777,784 A | 12/1973 | Nicholson | | |
| 4,090,589 A | 5/1978 | Fitzwater | | |
| 4,136,655 A ‡ | 1/1979 | Mannhardt | ........ | F02M 63/0008 123/462 |
| 4,249,453 A ‡ | 2/1981 | Riggs | ........................ | F15B 9/14 91/381 |
| 4,352,299 A ‡ | 10/1982 | Riggs | ........................ | F15B 9/12 74/435 |
| 4,420,014 A ‡ | 12/1983 | Riggs | ........................ | F15B 9/12 137/468 |
| 4,664,084 A | 5/1987 | Wheelock | | |
| 4,672,992 A | 6/1987 | Vanderlaan et al. | | |
| 4,793,377 A | 12/1988 | Haynes et al. | | |
| 5,024,247 A | 6/1991 | Lembke | | |
| 5,094,260 A ‡ | 3/1992 | Stuart | ................ | G05D 16/2053 137/102 |
| 5,385,218 A ‡ | 1/1995 | Migliori | ................ | F15B 15/065 188/303 |
| 6,214,300 B1 | 4/2001 | Morrison et al. | | |
| 6,776,393 B2 | 8/2004 | Burgos | | |
| 7,337,806 B2 ‡ | 3/2008 | Spickard | ................. | F02C 9/263 137/625.64 |
| 7,351,179 B2 | 4/2008 | Spickard | | |
| 7,458,394 B2 | 12/2008 | Achmad et al. | | |
| 7,631,663 B2 | 12/2009 | Rauch et al. | | |
| 7,926,512 B2 | 4/2011 | Spickard et al. | | |
| 7,963,185 B2 | 6/2011 | Spickard | | |
| 2003/0226995 A1 | 12/2003 | Burgos | | |
| 2005/0166752 A1‡ | 8/2005 | Nomura | ................... | F15B 15/24 92/5 R |
| 2006/0218928 A1 | 10/2006 | Spickard et al. | | |
| 2007/0069592 A1 | 3/2007 | Spickard | | |
| 2008/0312025 A1‡ | 12/2008 | Spickard | ................. | H02K 37/14 475/255 |

FOREIGN PATENT DOCUMENTS

| | | |
|---|---|---|
| JP | 6081811 A | 3/1994 |
| JP | 2007333130 A | 12/2007 |
| KR | 10-2001-0021669 A | 3/2001 |

‡ imported from a related application

STEPPER MOTOR DRIVEN PROPORTIONAL ROTARY ACTUATOR

CROSS-REFERENCE TO RELATED PATENT APPLICATIONS

This patent application is a continuation of co-pending U.S. patent application Ser. No. 15/228,097, filed Aug. 4, 2016, the entire teachings and disclosure of which are incorporated herein by reference thereto.

FIELD OF THE INVENTION

This invention pertains to actuators, and more particularly to sensorless actuators.

BACKGROUND OF THE INVENTION

Many systems incorporate hydraulic actuators into the design of their control systems. For instance, in certain aircraft systems, hydraulic actuators may be used to control valves that regulate the flow of fluid within the aircraft system. In order to provide precision control, some hydraulic actuators rely on hydraulic amplification to move an end effector, such as a hydraulic cylinder or a valve closure.

In conventional actuator systems, a closed loop position control system is typically employed. These systems include a position sensor for actuator position feedback, e.g., position of the end effector, and either an integrating controller or proportional controller used for control. The integrating controller assures that the steady state sensed position matches the commanded position. However, the actual position versus commanded position is still susceptible to inaccuracies of the position sensor gain and position (i.e., calibration of the position sensor to the valve position), the position sensor demodulator accuracy, channel-channel tracking and digital resolution. The proportional controller is susceptible to the above inaccuracies as well as an allowed steady state error that is a function of disturbance magnitudes and the proportional gain of the controller.

Regardless of the controller type, the accuracy of the system is very highly dependent on the position sensor accuracy. For precise positioning applications such as in aircraft systems, the position sensors need to be very accurate and have high resolution. While very accurate, the position sensors are typically very expensive, both in terms of time and cost. They are relatively difficult to interface with due to the mechanical interface, the hydraulic interface, the number of small gauge wires, complicated demodulation circuitry, etc. Position sensors are also prone to failure due to the unreliability of small gauge wires. This failure mode leads to dual channel requirements (i.e., two separate position sensors, drivers, and motor control) and additional cost in order to meet reliability requirements.

Elimination of the position feedback sensor will save money and weight. However, the lack of position feedback and the closed loop controller means that the effects of disturbances and/or the variations in forward path gain that are sensed and/or compensated in the closed loop controller will no longer be sensed and/or compensated. To negate these adverse effects, the magnitude of the disturbances should be minimized, the inherent disturbance rejection characteristics of the forward path should be maximized and the gain accuracy of the forward path should be made insensitive to the environment. In other words, the forward path must be "robust." The forward path must also be strictly proportional since there is no feedback to prevent the divergence that would occur with an integrating forward path.

Open loop, proportional electro-hydraulic servo valve (EHSV) based actuator systems use a low energy torque motor that controls hydraulics that drive the actuator. The motor used has high speed but very low torque. The low torque levels result in the motor (and thus the actuator) being substantially affected by relatively small DC torque disturbances. For example, isolation seals, relaxation of torsion spring preload, magnet MMF (magnetomotive force) variations, variations in flux path reluctance, discrete steps in nozzle pressure feedback forces, thermal induced movement of parts, etc. can affect the torque motor. The relatively undamped torque motor also does not support good dynamic torque disturbance rejection (e.g., current transient, vibration, etc.) and creates resonance issues. The actuator position is fed back to the motor via springs. This indirect position feedback technique does not provide adequate load disturbance rejection for most applications.

What is needed is a system that overcomes the problems of sensorless actuators as discussed above. The invention provides a system with such features. These and other advantages of the invention, as well as additional inventive features, will be apparent from the description of the invention provided herein.

BRIEF SUMMARY OF THE INVENTION

In various aspects, a stepper motor driven actuator system is provided. The system provides robust control for a variety of applications, such as rotary valves. The system includes a stepper motor that, through a gearbox system, controls the position of a valve piston. Movement of the valve piston hydraulically rotates a rotary actuator to open and close the rotary valve. In rotating the rotary actuator, the rotary actuator also re-nulls the position of the valve piston.

In one aspect, embodiments of the invention provide a stepper motor driven actuator system. The system includes a stepper motor, a cam, and a gearbox system that operatively connects the stepper motor to the cam. The cam rotates in response to stepping of the stepper motor. The system also includes a valve having a control piston located therein. The control piston is configured to translate in response to rotation of the cam. The system further includes a rotary actuator. The rotary actuator is fluidly connected to the valve, and the rotary actuator is configured to rotate the cam in response to translation of the control piston.

In an embodiment of the stepper motor driven actuator system, the system further includes a driveshaft of the stepper motor, a planet frame having an output shaft operatively connected to the cam, and a re-nulling gear configured to rotate in response to rotation of the rotary actuator. In this embodiment, the gearbox system includes a sun gear, a plurality of planetary gears, and a planetary ring gear. Additionally, the re-nulling gear is in mesh relation to the planetary ring gear, and the driveshaft of the stepper motor is integral with the sun gear. Further, the planet frame causes rotation of the cam in response to stepping of the stepper motor and in response to rotation of the rotary actuator.

In one embodiment of the stepper motor driven actuator system, the control piston further comprises two nozzles. The two nozzles each providing fluid communication between a supply port of the valve body and a drain port of the valve body. The two nozzles are positioned on opposite sides of the cam. A gap is provided on the opposite sides of the cam between each of the two nozzles and the cam, and rotation of the cam determines the relative size of the gap on each side of the cam, thereby controlling the amount of translation of the control piston.

In another embodiment of stepper motor driven actuator system, the control piston further comprises, at a first end, a single nozzle positioned on one side of the cam and, at a second end, a projection on the opposite side of the cam. The second end is biased with a preload towards the cam via a spring. A gap is provided between the nozzle and the cam, and another gap is provided between the projection and the cam. Rotation of the cam determines the relative size of the gaps, thereby controlling the amount of translation of the control piston.

In a further embodiment of the stepper motor driven actuator system, the control piston further comprises, at a first end, a single nozzle positioned on one side of the cam and, at a second end, a double diameter end portion having a projection on the opposite side of the cam. The double diameter end portion further includes a plunger defining a surface with a first diameter and a ring surface around the plunger defining a second diameter. The double diameter end portion is biased towards the cam via a differential hydraulic pressure including a hydraulic pressure from a first supply port of the valve body on the surface of the plunger and a hydraulic pressure from a first drain port of the valve body on the ring surface. A gap is provided between the nozzle and the cam and another gap is provided between the projection and the cam. Rotation of the cam determines the relative size of the gap, thereby controlling the amount of translation of the control piston.

Other aspects, objectives and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Generally, embodiments of a stepper motor driven actuator system are provided. As will be recognized from the following disclosure, the stepper motor driven actuator system eliminates the need for a position sensor and electronic position feedback. Additionally, the hydraulic amplification that is typically provided by an EHSV flapper valve is eliminated and replaced with a constant gain cam-nozzle amplification-tracking system. The combination of a cam-nozzle, stepper motor, and a gearbox in communication with the ring gear of the rotary actuator provides an accurate and robust actuation positioning system. A person having ordinary skill in the art will recognize these and other advantages from the present disclosure. Moreover, while the stepper motor driven actuator system is described in terms of a valve control device, the use of the stepper motor driven actuator system is not limited to this context.

Figure 1:
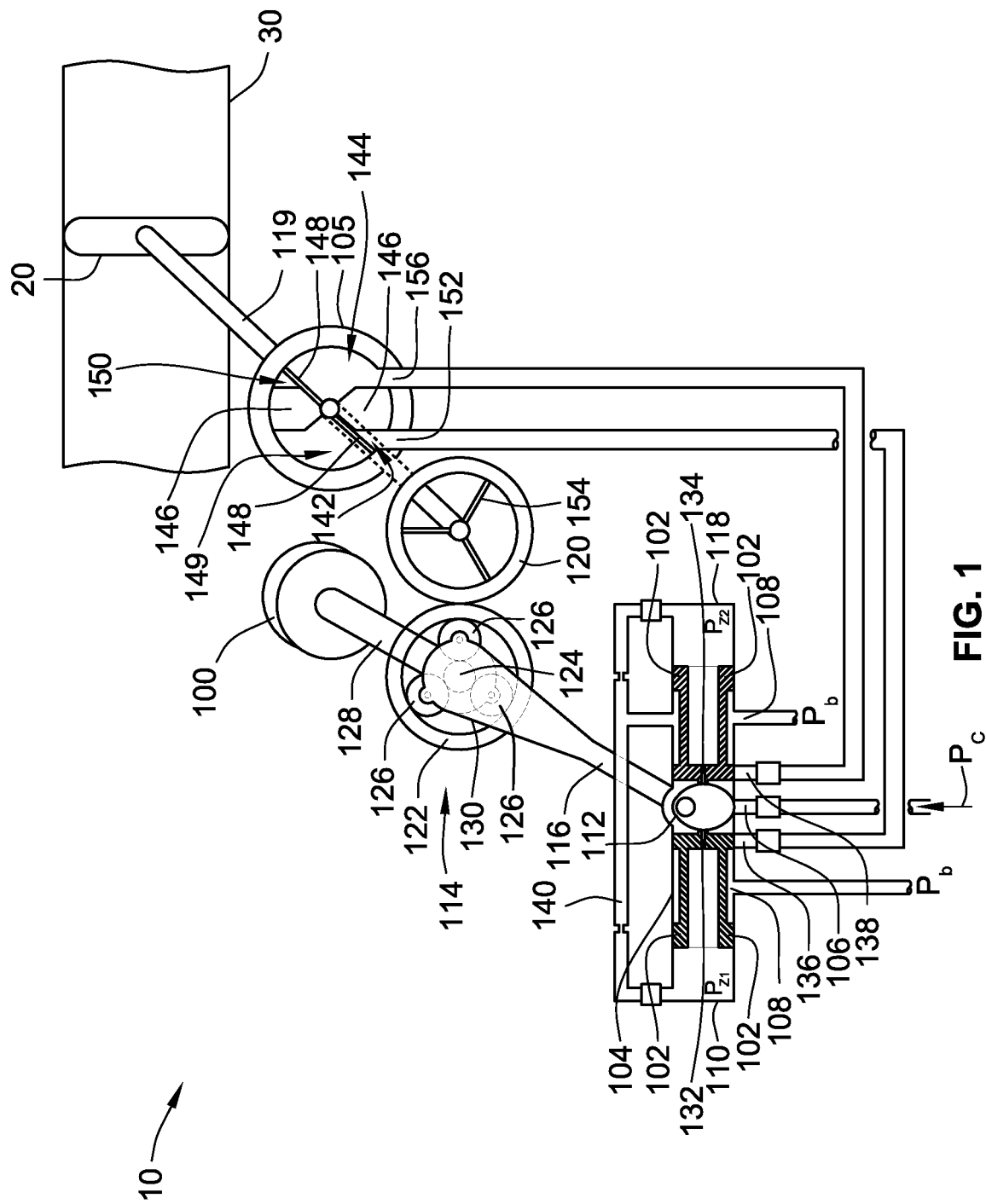
FIG. 1 is a partial cross-sectional view of an actuator system with the stepper motor shown as a separate component for clarity and the valve piston at a centered position according to an exemplary embodiment of the present invention.

Turning to the drawings, wherein like reference numerals refer to like elements, an embodiment of the stepper motor driven actuator system is provided. Referring to FIG. 1, an embodiment of the stepper motor driven actuator system 10 is depicted. In the embodiment shown, the stepper motor driven actuator system 10 controls the rotation of a rotary valve, such as butterfly valve 20, within a flow conduit 30. For example, the stepper motor driven actuator system 10 can be used to control the flow of gases within the flow conduit 30 by rotating the butterfly valve 20 between a fully closed position and a fully open position. As depicted in FIG. 1, the butter fly valve 20 is in a closed position. As will be recognized by those having ordinary skill in the art, a variety of valves could be utilized with the stepper motor driven actuator system, including butterfly valves, stop-cock valves, ball valves, etc.

Broadly, the position of the butterfly valve 20 is determined by the commanded position of a stepper motor 100. The stepper motor 100 is hydromechanically connected to a control piston 102 in a four-way pilot valve 104. In this way, the stepper motor 100 controls the position of the control piston 102 within the four-way pilot valve 104. Through hydraulic amplification in the four-way pilot valve 104, the control piston 102 adjusts the pressure in a rotary actuator 105. As shown in FIG. 1, the rotary actuator 105 is mechanically connected to the butterfly valve 20. Accordingly, the movement of the motor 100 is hydraulically amplified in the four-way pilot valve 104 to rotate the rotary actuator 105 and, thus, the butterfly valve 20.

In FIG. 1, the control piston 102 is in a null position within the four-way pilot valve 104, that is, the control piston 102 is located at the center of the four-way pilot valve 104. In this position, fluid flows into the four-way pilot valve 104 through a supply port 106 and out of the four-way pilot valve 104 through a drain port 108. The supply port 106 draws fluid from a hydraulic fluid tank and pump (not shown), while the drain port 108 returns fluid to the hydraulic fluid tank.

Figure 2:
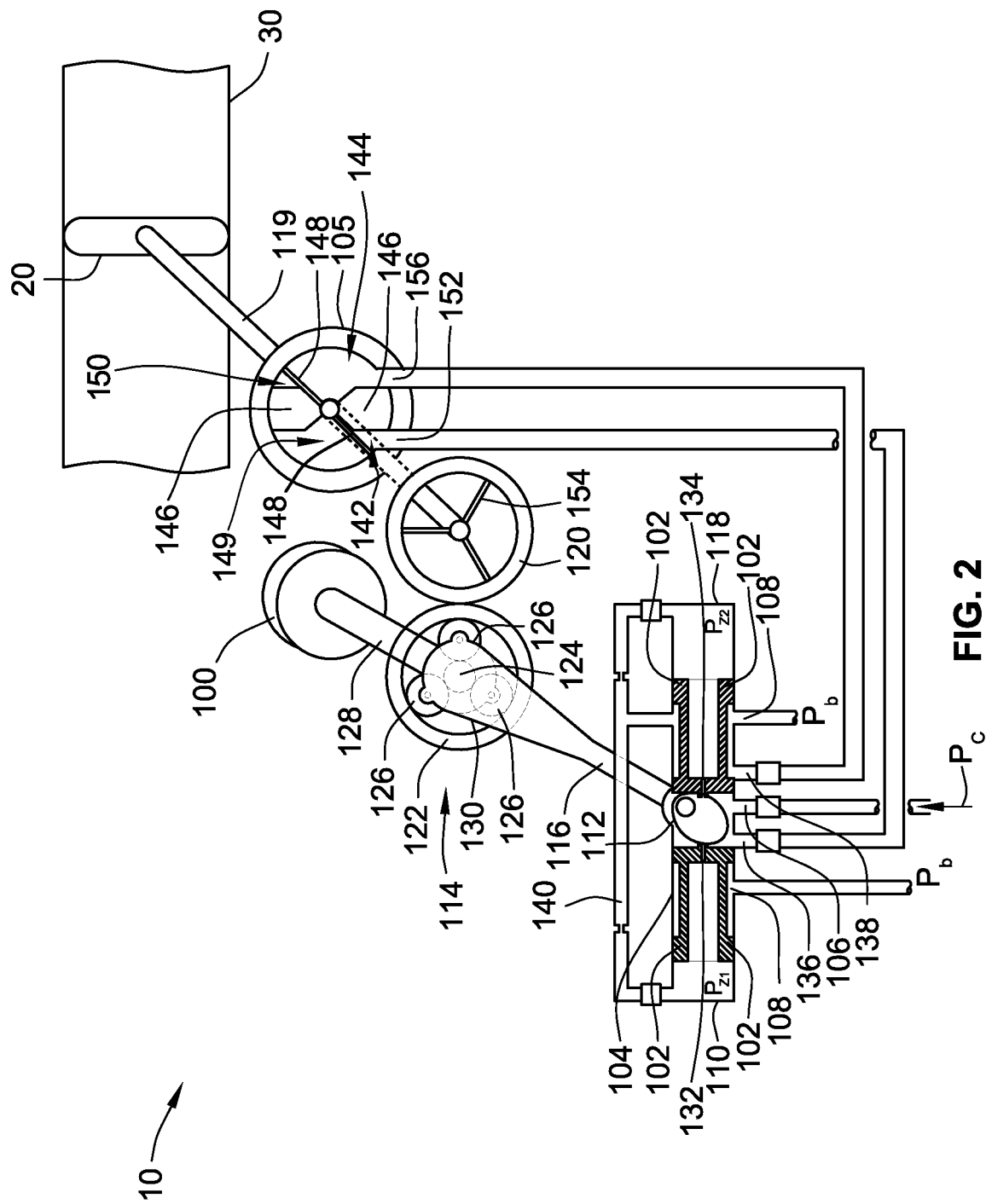
FIG. 2 is a partial cross-sectional view of the actuator system of FIG. 1 with the control piston at a left-most position according to an exemplary embodiment of the present invention.

Referring briefly to FIG. 2, the control piston 102 is depicted in a left-most position 110 within the four-way pilot valve 104. The stepper motor 100 is mechanically connected to a cam 112 via a gearbox system 114 and an output shaft 116 such that the cam 112 rotates in conjunction with rotation produced in the motor 100. When the cam 112 rotates, the control piston 102 translates left or right within the four-way pilot valve 104. As shown in FIG. 2, the control piston 102 has moved to the left.

Figure 3:
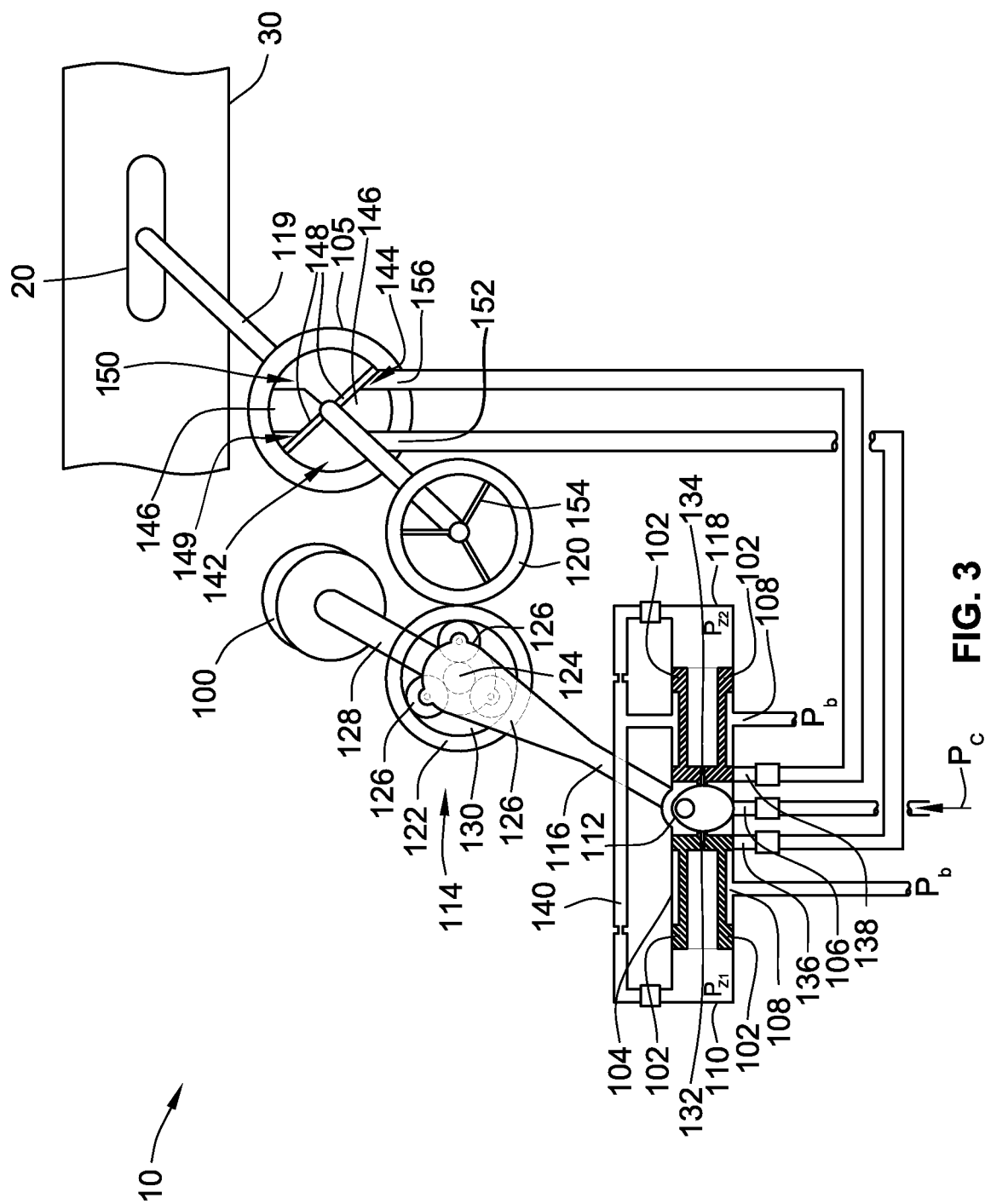
FIG. 3 is a partial cross-sectional view of the actuator system of FIG. 1 with the control piston re-nulled and the rotary actuator rotated clockwise.

The movement of the control piston 102 hydraulically rotates the rotary actuator 105, which can be seen in FIG. 3. Thus, when the control piston 102 moves to the left, the rotary actuator 105, and consequently the butterfly valve 20, rotate clockwise.

The rotary actuator 105 is mechanically connected to the butterfly valve 20 via a rotatable shaft 119 that extends transversely through the rotary actuator 105. The portion of the rotatable shaft 119 extending from the front of the rotary actuator 105 (as depicted in FIG. 3) is connected to a re-nulling gear 120. Generally, the re-nulling gear 120 is in mechanical communication with the gearbox system 114. The re-nulling gear 120 rotates the cam 112 in the direction opposite of the motor 100 such that the control piston 102 is returned to the null (i.e., center) position within the four-way pilot valve 104 as is shown in FIG. 3. By mechanically re-nulling the four-way pilot valve 104, the position of the butterfly valve 20 becomes directly proportional to the position of the motor 100, thus eliminating the need for electronic feedback to determine the position of the butterfly valve 20.

Figure 4:
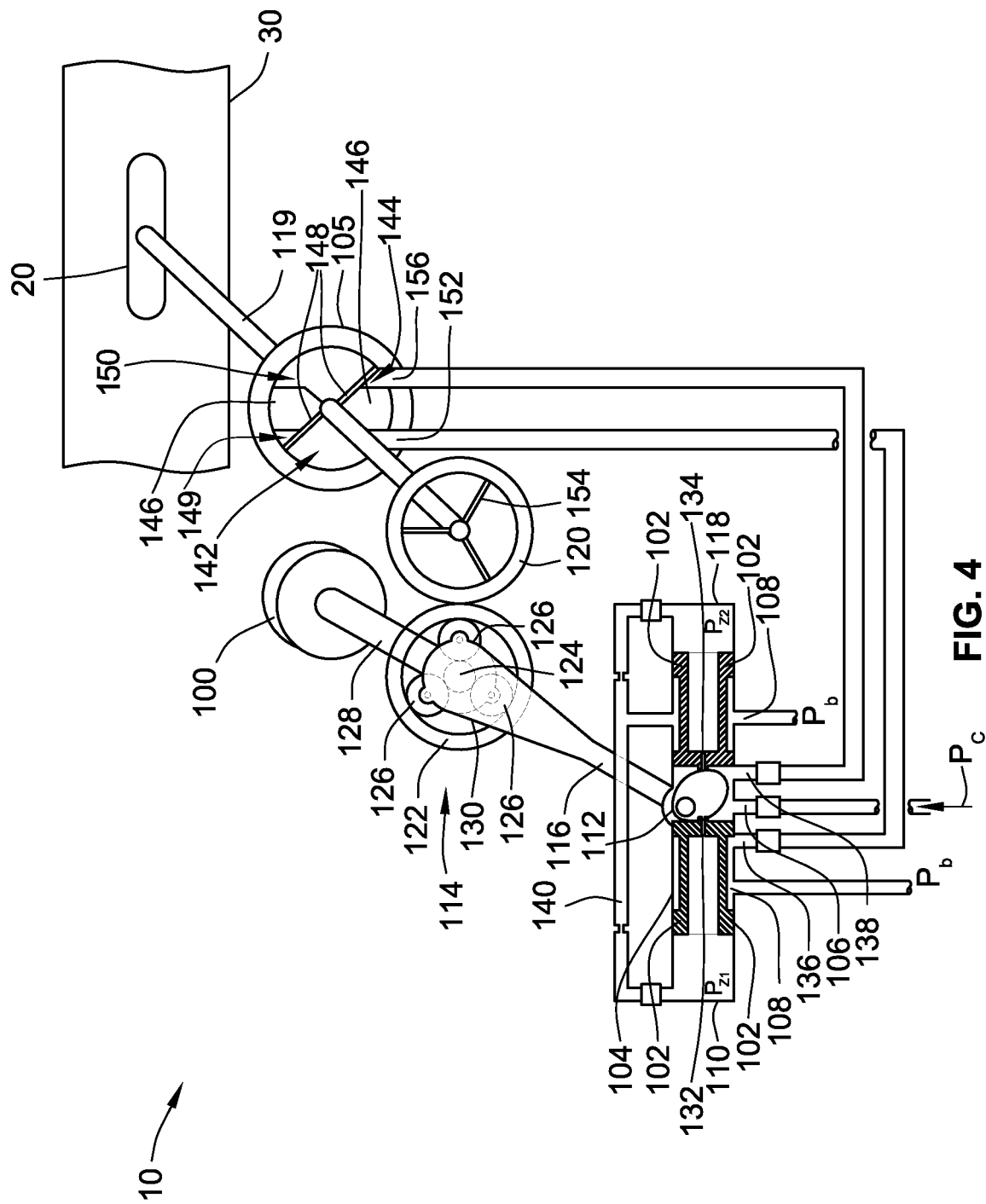
FIG. 4 is a partial cross-sectional view of the actuator system of FIG. 1 with the control piston at a right-most position according to an exemplary embodiment of the present invention.

FIG. 4 shows the control piston 102 in a right-most position 118 within the four-way pilot valve 104. The movement of the control piston to the right creates hydraulic pressure that acts on the rotary actuator 105. Thus, as shown in FIG. 1, the rotary actuator 105 will rotate counterclockwise, which closes the butterfly valve 20. Accordingly, as depicted in FIGS. 1-4, the stepper motor 102 rotates the cam 112, which moves the control piston 102 to the left or to the right within the four-way pilot valve 104. The movement of the control piston 102 creates hydraulic pressure that rotates the rotary actuator 105. When the rotary actuator 105 rotates, two things happen: the butterfly valve 20 is opened or closed and the control piston 102 is re-nulled in the four-way pilot valve 104.

Having provided a general overview of the stepper motor driven actuator system 10, the following discussion will provide a more detailed description of the system's operation. As shown in FIG. 1, the stepper motor 100 drives gearbox system 114. In the embodiment depicted, the gearbox system 114 is a planetary gear system, including a planetary ring gear 122, a sun gear 124, and planet gears 126. The sun gear 124 is integral to a driveshaft 128 of the stepper motor 100. Thus, when the stepper motor 100 is rotated, the sun gear 124 rotates. Rotation of the sun gear 124 causes the planet gears 126 to rotate. The planet gears 126 are able to rotate because the re-nulling gear 120 holds the planetary ring gear 122 stationary. The planet gears 126 are operably connected to a planet frame 130, which is operably connected to the output shaft 116. Thus, the stepper motor 100 produces rotation of the driveshaft 128, causing rotation of the planetary gear system 114 and planet frame 130, and the rotation of the planet frame 130 cause rotation of the output shaft 116 and the cam 112.

In FIG. 1, when the cam 112 is in the null position, the hydraulic flow will enter supply port 106, pass through the cam-nozzle-orifice system (i.e., around cam 112 and through nozzles 132, 134 and corresponding orifices), enter a line 140, and then drain out through drain port 108 because of the lower pressure Pb in the drain. It should be noted that the direction of flow is from supply port 106 and into the nozzles 132, 134 via the cam-nozzle gap (i.e., "flow in") as compared to conventional valves where flow is from ends of the control piston 102 out of the nozzles 132, 134 (i.e., "flow out").

Referring now to FIG. 2, the cam 112 is rotated to the left such that the control piston 102 is translated towards the left-most position 110 in the four-way pilot valve 104. The translation of the control piston 102 results from a decrease in the size of a gap between the cam 112 and a first nozzle 132 on the left side of the cam 112 and an increase in the size of a gap between the cam 112 and second nozzle 134 on the right side of the cam 112. The differences in the gaps affect pressures Pz1 and Pz2 on each end of the control piston 102 so as to force the control piston 102 in the direction that will re-equalize the cam-nozzle gaps. When the control piston 102 translates to the left, the supply port 106 is opened to a first valve port 136. When this occurs, the hydraulic flow passes through supply port 106, into first valve port 136 and returns through a second valve port 138 and discharges out drain port 108. In flowing in this fashion, the fluid passes through the rotary actuator 105. The first valve port 136 is in fluid communication with a first chamber 142 of the rotary actuator 105. The second valve port 138 is in fluid communication with a second chamber 144.

A variety of rotary actuators 106 are suitable for use in the present stepper motor driven actuator system 10, including single- and double-vane, rack-and-pinion, spiral shaft, chain-and-sprocket, helical spline, enclosed piston crank, Scotch yoke, etc. As depicted throughout the figures and with particular reference to FIG. 2, the rotary actuator 105 is a double-vane rotary actuator in which the first chamber 142 and the second chamber 144 are separated by barriers 146 and vanes 148. As depicted in FIG. 2, the rotatable shaft 119 is shown in partial phantom lines so as to depict both vanes 148. The vanes 148 are connected to the rotatable shaft 119. In the double-vane rotary actuator embodiment, the rotary actuator 105 includes through paths (not shown) across the upper barrier 146 such that a first upper chamber 149 and a second upper chamber 150 are in fluid communication. In this way, when the vanes 148 rotate, the decreasing volume of the first upper chamber 149 can be ported to the second upper chamber 150 and vice versa.

For instance, when fluid flows into a first actuator port 152 of the rotary actuator 105 from the first valve port 136, the fluid applies pressure to the vane 148 in the first chamber 142, which causes rotation of the rotatable shaft 119. The vane 148 in the second chamber 144 also rotates, causing fluid to flow out of a second actuator port 156 of the rotary actuator 105 into the second valve port 138. As depicted in FIG. 2, the control piston 102 is positioned such that the second valve port 138 is in fluid communication with the drain port 108 to allow the fluid to drain.

As depicted in FIG. 3, the vanes 148 of the rotary actuator 105 have rotated clockwise, opening the butterfly valve 20. Additionally, the rotatable shaft 119 is connected to the re-nulling gear 120 such as through spokes 154. Because the re-nulling gear 120 is in mesh relation with the planetary ring gear 122, the rotation of the rotary actuator 105 is translated through the re-nulling gear 120 to the planetary ring gear 122. At this point, the stepper motor 100 has completed its step, and thus, the driveshaft 128 is locked, which means that the sun gear 124 is also locked. Therefore, when the planetary ring gear 122 rotates, the planet gears 126 rotate, thereby rotating the cam 112. Thus, as shown in FIG. 3, the control piston 102 has returned to the null-position. In this way, the re-nulling gear 120 provides direct, mechanical actuator position feedback to the planetary ring gear 122, causing the planetary ring gear 122 to rotate. Accordingly, the need for complicated and expensive electronic feedback mechanisms is eliminated.

Turning to FIG. 4, when the cam 102 is positioned such that the control piston 122 is towards the right-most position 118 in the four-way pilot valve 104, the supply port 106 is opened to the second valve port 138. The hydraulic flow passes through supply port 106, into second valve port 138 to the rotary actuator 105. The pressure of the fluid flow causes the vane 148 in the second chamber 144 to rotate the rotatable shaft 119 in a counterclockwise direction. The vane 148 in the first chamber 142 also rotates, forcing fluid flow out of the first actuator port 152 to the first valve port 136. The fluid then discharges out of drain port 108. Thus, the system 10 returns to the configuration shown in FIG. 1 in which the butterfly valve 20 has been closed and the control piston 102 has been re-nulled.

The primary disturbance to the system is the force input to the rotary actuator 105. Any movement of the rotatable shaft 119 of the rotary actuator 105 will cause the re-nulling gear 120 to rotate, which will result in planetary ring gear 122 rotation. Any planetary ring gear 122 movement results in cam 112 rotation due to the precision planetary gearbox system 114. The high pressure gain of the system assures control piston 102 movement for any cam 112 rotation. The high pressure gain of the first valve port 136 and second valve port 138 coupled with the rotary actuator resistance will result in the required resistive force with minimal position error.

The stepper motor system 10 is a relatively low energy motor coupled to relatively high energy hydraulics. The stepper motor 100 in combination with a planetary gearbox system 114 provides the capability to decrease stepper motor speed and increase its torque while staying at the same energy level. In this way, gearbox system 104 can be used to increase the motor torque, decrease its susceptibility to torque disturbances and still keep the motor fast enough to handle dynamic operation. The stepper motor 100 has nearly perfect gain and is essentially unaffected by torque disturbances due to higher torque capability, the planetary gearbox 114 torque amplification, and the inherent detent feature of the stepper motor 100. The round, symmetrical, balanced construction of the stepper motor 100 is in essence unaffected by vibration and temperature variations.

The precision machined placement of the stator and rotor teeth (not shown) of the stepper motor 100 provide the inherent baseline position and gain accuracy of the stepper motor 100. The precision machining provides accurate calibration such that the need for a sensor is eliminated. Moreover, this accuracy does not change with life, is essentially constant from unit to unit, and is not a function of any calibration procedure. The round, symmetric construction of the stepper motor 100 maintains this accuracy in the presence of environment variations (e.g., temperature). Torque disturbances at the output shaft 116 such as dynamic seal friction, nozzle hydraulic loads, unbalanced cam mass, etc. are minimal and are essentially rejected by the precision planetary gearbox system 114 (comprising sun gear 124, planetary ring gear 122, planet gears 126 and planet frame 130) and the high detent torque of the stepper motor 100. The detent torque prevents disturbances from having any appreciable effect until they reach such a magnitude that they completely overpower the stepper motor 100. The driveshaft 128 of the stepper motor 100 rides on precision ball bearings (not shown) and is inherently precision-balanced about its rotation axis in the presence of translational accelerations (i.e., vibration), so the torque disturbances at the driveshaft 128 of the motor 100 are negligible. The stepper motor 100 has no channel-channel tracking error due to the fact that both channels share the same rotor-stator-pole flux circuit. Power transients have no effect on steady state operation and the precision planetary gearbox system 114 has minimal backlash. In one embodiment, the backlash of the planetary gearbox system 114 is approximately two step increments of the stepper motor 100.

Figure 5:
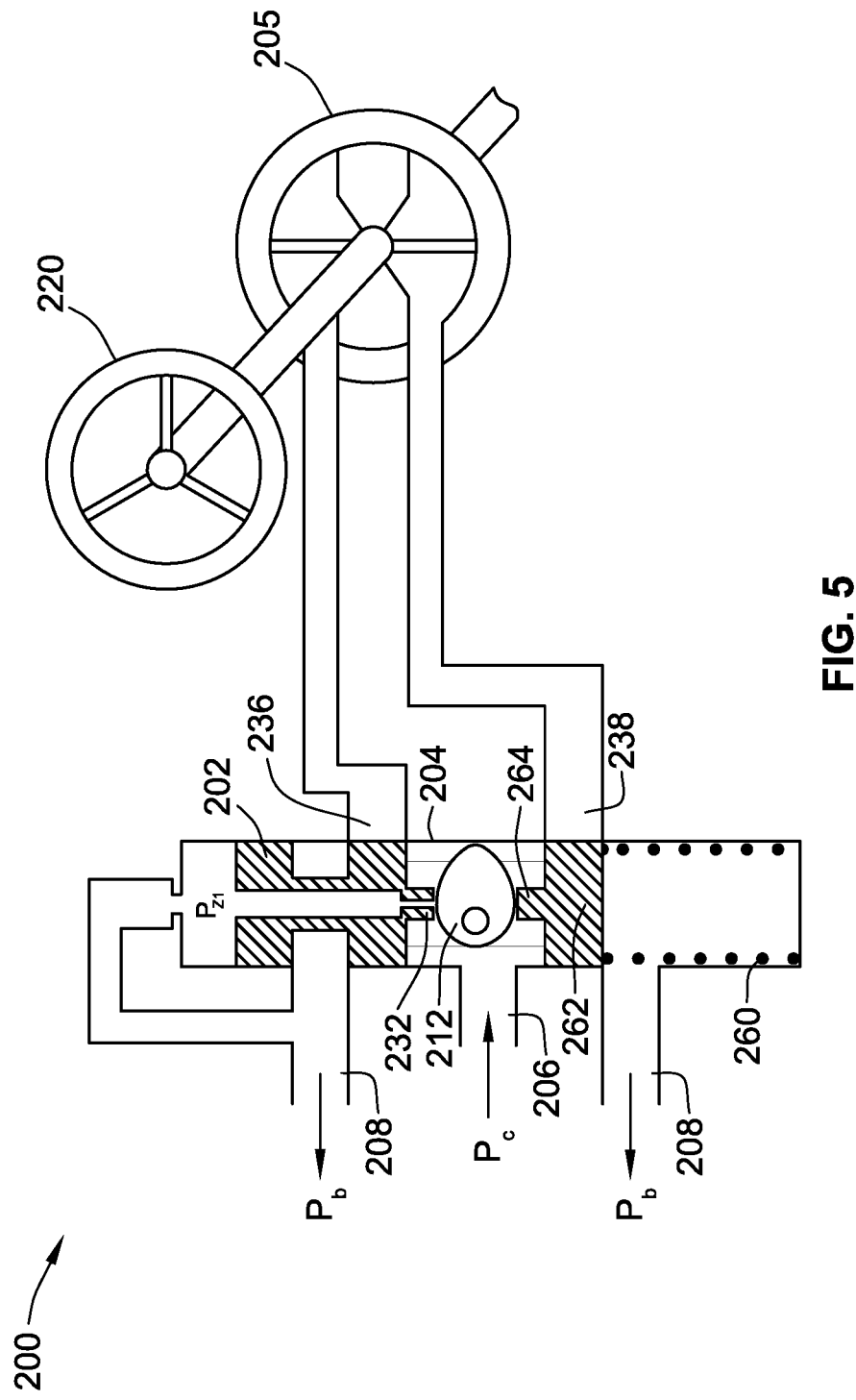
FIG. 5 is a partial cross-sectional view of a single nozzle embodiment of the rotary actuator system according to an exemplary embodiment of the present invention.
Figure 6:
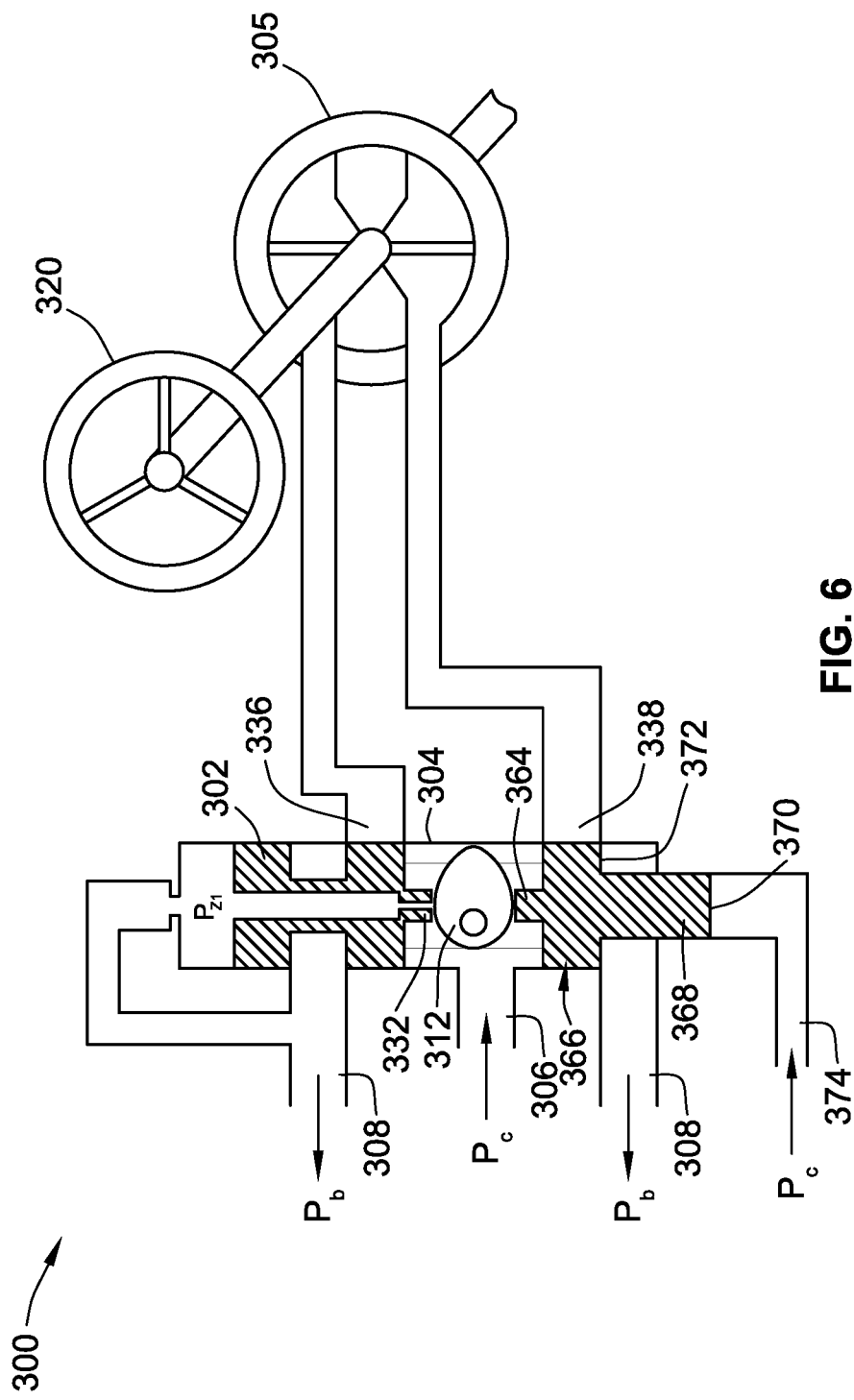
FIG. 6 is a partial cross-sectional view of another single nozzle actuator system embodiment of the rotary actuator system according to an exemplary embodiment of the present invention.

Having discussed a two-nozzle embodiment of a stepper motor driven actuator system 10 in FIGS. 1-4, the following discussion will focus on the single nozzle embodiments depicted in FIGS. 5 and 6. In FIGS. 5 and 6, elements in common with the stepper motor driven actuator system 10 will have like reference numerals albeit increased by one hundred in FIG. 5 and two hundred in FIG. 6.

Referring first to FIG. 5, a first embodiment of a single-nozzle actuator system 200 is depicted and includes a spring 260 at one end of the control piston 202. The spring 260 contacts one end of the four-way pilot valve 204 and a lower end 262 (in relation to the orientation of FIG. 5) of the control piston 202. The lower end 262 includes a projection 264 that is similar in size and shape to the nozzle 232 at end upper end 263 of the control piston 202 albeit without a fluid pathway. The spring 260 provides a preload on the lower end 262 of the control piston 202, thereby biasing it towards the cam 212. This preload is balanced by the pressure Pz1 existing at the upper end 263 of the control piston 202. Pz1 is regulated between the pressure at supply port 206 (Pc) and the pressure at drain port 208 (Pb) as a function of the cam 212 and nozzle 232 gap. In the presence of a constant spring force (spring scale is neglected) and constant Pc-Pb pressure, the fluid gap between the cam 212 and the nozzle 232 (and cam 212 and projection 264) is constant. This assures that the piston 202 position is a function of cam 212 position, and only cam 212 position.

Assuming a 10 lb preload, a hydraulic pressure differential Pc−Pb=100 psid, and a 66% pressure recovery for purposes of example, a 0.625" piston 202 will provide a 20 lb hydraulic force, which provides 10 lbs to resist the spring force and 10 lbs for force margin. Assuming (for the purposes of this example) an additional 10 lb force can be mechanically applied by the cam 212 contacting the nozzle 232 or projection 264, the total hydraulic force plus cam force, or spring force plus cam force, can provide a total force margin of ±20 lbs. Those skilled in the art will recognize from the foregoing discussion that other preload forces, pressure differentials, pressure recoveries, piston sizes, etc. (collectively, "actuator system characteristics") may be provided depending on the operating parameters and conditions of the particular installation, and therefore, all such actuator system characteristics are to be included herein.

Besides the provisions made to use only a single nozzle 232, the single-nozzle actuator 200 of FIG. 5 operates in much the same way as the stepper motor driven actuator system 10 of FIGS. 1-4. Thus, with reference to FIG. 5, the control piston 202 translates in response to rotation of the cam 212 caused by the stepper motor (not shown). The translation of the control piston 202 opens the first port 236 or second port 238 to the supply port 206. The corresponding change in hydraulic pressure causes actuation of the rotary actuator 205 and thereby a re-nulling action by the re-nulling gear 220.

FIG. 6 depicts a second embodiment of a single-nozzle actuator system 300 that utilizes a piston 302 with a double diameter end portion 366 with an unregulated hydraulic pressure differential Pc-Pb. The double diameter end portion 366 includes a plunger portion 368 having a surface 370 with a first diameter. Surrounding the plunger portion 368 is a ring surface 372. The surface 370 of the plunger portion 368 is acted on by hydraulic pressure from a second supply port 374 that has the same hydraulic pressure as the supply port 306. The ring surface 372 is acted on by the hydraulic pressure from a second drain port 376 that has the same pressure as the drain port 308. The hydraulic force varies with Pc (at second supply port 374)−Pb (at second drain port 376) in the same manner that the Pz1 force does on the opposite end of the control piston 302. This trait ensures that the cam 312 nozzle 332 gap stays constant in the presence of a varying Pc−Pb, which ensures that the position of the piston 302 is a function of the cam 312, and only the cam 312.

Besides the provisions made to use only a single nozzle 320, the single-nozzle actuator 300 of FIG. 6 operates in much the same way as the stepper motor driven actuator system 10 of FIGS. 1-4. Thus, with reference to FIG. 6, the control piston 302 translates in response to rotation of the cam 312 caused by the stepper motor (not shown). The translation of the control piston 302 opens the first port 336 or second port 338 to the supply port 306. The corresponding change in hydraulic pressure causes actuation of the rotary actuator 305 and thereby a re-nulling action by the re-nulling gear 320.

As can be seen from the foregoing, a robust stepper motor driven proportional actuator has been described. Robustness, as used herein, refers to the ability of a system to remain accurate in the presence of disturbance inputs and environment variations. Disturbances lead to a shift in the entire step versus position plot and gain variations lead to changes in the slope of the plot. Disturbances are due to undesired torques and forces as well as imperfect calibration. Gain variations are due to the change in output/input characteristics due to component life and environment. Robustness is obtained by embodiments of the invention by minimizing the magnitude of disturbances where possible, by isolating the device from disturbances where necessary, maximizing the disturbance rejection characteristics of the device, designing a device with minimal wear and/or whose performance is unaffected by wear, precision calibration, and inherent gain accuracy in the presence of environment variations (e.g., temperature, stray flux, vibration, pressures, etc.).

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. For example, a ball screw can be used where the ball portion is mounted in the actuator with the screw integral to the ring gear. Actuator translation would cause the ring gear to rotate as described above. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A stepper motor driven actuator system comprising:
   a stepper motor;
   a cam;
   a gearbox system including a ring gear, the gearbox system operatively connecting the stepper motor to the cam such that the cam rotates in response to stepping of the stepper motor;
   a valve having a control piston located therein, the control piston configured to translate in response to rotation of the cam; and
   a rotary actuator, the rotary actuator fluidly connected to the valve;
   wherein translation of the control piston of the valve directly imparts only rotary motion to the rotary actuator; and
   wherein the rotary actuator is configured to rotate the ring gear of the gearbox system to re-center the cam.

2. A stepper motor driven actuator system comprising:
   a stepper motor;
   a cam;
   a gearbox system including a ring gear, the gearbox system operatively connecting the stepper motor to the cam such that the cam rotates in response to stepping of the stepper motor;
   a valve having a control piston located therein, the control piston configured to translate in response to rotation of the cam; and
   a rotary actuator, the rotary actuator fluidly connected to the valve;
   wherein translation of the control piston of the valve directly imparts rotary motion to the rotary actuator; and
   wherein the rotary actuator is configured to rotate the ring gear of the gearbox system to re-center the cam; and
   further comprising
   a driveshaft of the stepper motor;
   a planet frame having an output shaft operatively connected to the cam; and
   a re-nulling gear configured to rotate in response to rotation of the rotary actuator;
   wherein the gearbox system includes a sun gear, a plurality of planetary gears, and the ring gear;
   wherein the re-nulling gear is in mesh relation to the ring gear;
   wherein the driveshaft of the stepper motor is integral with the sun gear; and
   wherein the planet frame causes rotation of the cam in response to stepping of the stepper motor and in response to rotation of the rotary actuator.

3. The stepper motor driven actuator system of claim 1, wherein the control piston further comprises two nozzles, the two nozzles each providing fluid communication between a supply port of the valve and a drain port of the valve;

wherein the two nozzles are positioned on opposite sides of the cam;
wherein a gap is provided on opposite sides of the cam between each of the two nozzles and the cam; and
wherein rotation of the cam determines a relative size of the gap on each side of the cam, thereby controlling an amount of translation of the control piston.

4. The stepper motor driven actuator system of claim 3, wherein translation of the control piston in a first direction creates fluid communication between a first port in fluid communication with the rotary actuator and the supply port and between a second port in fluid communication with the rotary actuator and the drain port.

5. The stepper motor driven actuator system of claim 4, wherein translation of the control piston in a second direction creates fluid communication between the first port and the drain port and between the second port and the supply port.

6. The stepper motor driven actuator system of claim 5, wherein the control piston has a null position in which neither the first port nor the second port are in fluid communication with the supply port or the drain port.

7. The stepper motor driven actuator system of claim 6, wherein the rotary actuator returns the control piston to the null position after either the first port or the second port has been moved into fluid communication with the supply port.

8. The stepper motor driven actuator system of claim 1, wherein the control piston further comprises, at a first end, a single nozzle positioned on one side of the cam and, at a second end, a projection on an opposite side of the cam;
wherein the second end is biased with a preload towards the cam via a spring;
wherein a gap is provided between the single nozzle and the cam and another gap is provided between the projection and the cam; and
wherein rotation of the cam determines a relative size of the gaps, thereby controlling an amount of translation of the control piston.

9. The stepper motor driven actuator system of claim 8, wherein the single nozzle provides fluid communication between a supply port of the valve and a drain port of the valve;
wherein the valve comprises a first port in fluid communication with the rotary actuator and a second port in fluid communication with the rotary actuator; and
wherein a differential hydraulic pressure between supply port pressure and drain port pressure balances the preload of the spring such that the control piston remains in a null position in which neither the first port nor the second port is in fluid communication with the supply port.

10. The stepper motor driven actuator system of claim 9, wherein translation of the control piston in a first direction creates fluid communication between the first port and the supply port and between the second port and the drain port.

11. The stepper motor driven actuator system of claim 10, wherein translation of the control piston in a second direction creates fluid communication between the first port and the drain port and between the second port and the supply port.

12. The stepper motor driven actuator system of claim 11, wherein the rotary actuator returns the control piston to the null position after either the first port or the second port has been moved into fluid communication with the supply port.

13. The stepper motor driven actuator system of claim 1, wherein the control piston further comprises, at a first end, a single nozzle positioned on one side of the cam and, at a second end, a double diameter end portion having a projection on an opposite side of the cam;
wherein the double diameter end portion further includes a plunger defining a surface with a first diameter and a ring surface around the plunger defining a second diameter;
wherein the double diameter end portion is biased towards the cam via a differential hydraulic pressure including a hydraulic pressure from a first supply port of the valve on the surface of the plunger and a hydraulic pressure from a first drain port of the valve on the ring surface;
wherein a gap is provided between the single nozzle and the cam and another gap is provided between the projection and the cam; and
wherein rotation of the cam determines a relative size of the gap, thereby controlling an amount of translation of the control piston.

14. The stepper motor driven actuator system of claim 13, wherein the single nozzle provides fluid communication between a second supply port of the valve and a second drain port of the valve;
wherein the valve comprises a first port in fluid communication with the rotary actuator and a second port in fluid communication with the rotary actuator;
wherein a differential hydraulic pressure is created between hydraulic pressure from the second supply port and hydraulic pressure from the second drain port; and
wherein the differential hydraulic pressure from the first supply port and the first drain port balances the differential hydraulic pressure from the second supply port and the second drain port such that the control piston remains in a null position in which neither the first port nor the second port is in fluid communication with the second supply port.

15. The stepper motor driven actuator system of claim 14, wherein translation of the control piston in a first direction creates fluid communication between the first port and the second supply port and between the second port and the first and the second drain ports.

16. The stepper motor driven actuator system of claim 15, wherein translation of the control piston in a second direction creates fluid communication between the first port and the first and the second drain ports and between the second port and the second supply port.

17. The stepper motor driven actuator system of claim 16, wherein the rotary actuator returns the control piston to the null position after either the first port or the second port has been moved into fluid communication with the second supply port.

18. The stepper motor driven actuator system of claim 1, wherein the rotary actuator is of a type selected from the group consisting of single- and double-vane, rack-and-pinion, spiral shaft, chain-and-sprocket, helical spline, enclosed piston crank, and Scotch yoke.

19. The stepper motor driven actuator system of claim 1, wherein the system does not include a position feedback sensor for stepper motor.

20. The stepper motor driven actuator system of claim 1, wherein the rotary actuator is operatively connected to a rotary valve that controls flow of a fluid in a fluid conduit such that rotation of the rotary actuator causes rotation of the rotary valve.

21. The stepper motor driven actuator system of claim 1, wherein the rotary actuator rotates a re-nulling gear that is in mesh relationship to the ring gear.

22. The stepper motor driven actuator system of claim 1, wherein the ring gear is coupled on a periphery thereof to the rotary actuator.

23. The stepper motor driven actuator system of claim 1, wherein the ring gear does not form part of the rotary actuator.

24. The stepper motor driven actuator system of claim 1, wherein the ring gear includes an outer peripheral surface configured to be driven by the rotary actuator.

* * * * *